(12) United States Patent
Thakolsri et al.

(10) Patent No.: US 10,952,078 B2
(45) Date of Patent: Mar. 16, 2021

(54) METHOD FOR ASSOCIATING NETWORK FUNCTIONS WITH A NETWORK SLICE INSTANCE OF A MOBILE RADIO COMMUNICATION NETWORK

(71) Applicant: NTT DOCOMO, INC., Tokyo (JP)

(72) Inventors: Srisakul Thakolsri, Munich (DE); Malla Reddy Sama, Munich (DE); Atsushi Minokuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/611,446

(22) PCT Filed: May 4, 2018

(86) PCT No.: PCT/EP2018/061538
§ 371 (c)(1),
(2) Date: Nov. 6, 2019

(87) PCT Pub. No.: WO2018/206441
PCT Pub. Date: Nov. 15, 2018

(65) Prior Publication Data
US 2020/0145833 A1      May 7, 2020

(30) Foreign Application Priority Data

May 8, 2017   (EP) ..................... 17169989

(51) Int. Cl.
*G06F 13/00*       (2006.01)
*H04W 16/02*       (2009.01)
*H04W 24/02*       (2009.01)

(52) U.S. Cl.
CPC ........... *H04W 16/02* (2013.01); *H04W 24/02* (2013.01)

(58) Field of Classification Search
CPC ....... H04W 24/02; H04W 16/02; H04W 8/00; H04W 48/18; H04W 4/00; H04W 8/18; H04L 45/306; H04L 47/78
(Continued)

(56) References Cited

U.S. PATENT DOCUMENTS

2018/0317134 A1* 11/2018 Leroux ................. H04W 24/02
2019/0386878 A1* 12/2019 Chou ...................... H04W 4/50
(Continued)

OTHER PUBLICATIONS

International Search Report issued in PCT/EP2018/061538 dated May 25, 2018 (3 pages).
(Continued)

*Primary Examiner* — Kenneth R Coulter
(74) *Attorney, Agent, or Firm* — Osha Bergman Watanabe & Burton LLP

(57) ABSTRACT

According to one embodiment, a method for associating network functions with a network slice instance of a mobile radio communication network is described comprising an Network Slice Management Function, NSMF, creating an identifier for a network slice instance, NSI, for Operations Administration and Management, OAM, wherein the mobile radio communication network comprises a core network and an OAM system, wherein the OAM system comprises at least the NSMF which has interfaces to network functions in the core network, wherein the network functions provide a communication service to a mobile terminal and wherein the core network further comprises a Network Repository Function, NRF, that maintains an association of network functions and network slice instances of the mobile radio communication network; and the NSMF or the NRF notifying one or more network functions about their association with the network slice instance.

19 Claims, 14 Drawing Sheets

(58) Field of Classification Search
USPC .......................................... 709/223, 220–222
See application file for complete search history.

(56) References Cited

U.S. PATENT DOCUMENTS

2020/0163145 A1\* 5/2020 Park ..................... H04W 80/10
2020/0221529 A1\* 7/2020 Park ..................... H04W 76/25

OTHER PUBLICATIONS

Written Opinion of the International Searching Authority issued in PCT/EP2018/061538 dated May 25, 2018 (10 pages).
Huawei; "Add usecase and requirements for management support slice selection"; 3GPP TSG SA WG5 (Telecom Management) Meeting #111, S5-171122; Porto (Portugal) Jan. 16-20, 2017 (7 pages).
3GPP TR 28.801 V1.1.0; "3rd Generation Partnership Project; Technical Specification Group Services and System Aspects; Telecommunication management; Study on management and orchestration of network slicing for next generation network (Release 14)"; Mar. 2017 (60 pages).
ZTE et al.; "Proposed Network Slicing Update to 23.501 Clause 5.15"; SA WG2 Meeting #119, S2-171547; Dubrovnik, Croatia, Feb. 13-17, 2017 (5 pages).
Huawei; "Modify the network slice and slice subnet concepts"; 3GPP TSG SA WG5 (Telecom Management) Meeting #111 Bis, S5A-170113; Munich, (Germany) Feb. 13-17, 2017 (4 pages).
Huawei, China Mobile; "Add usecase and requirements for configuring CN with slice specific information"; 3GPP TSG SA WG5 (Telecom Management) Meeting #112, S5-171921; Guilin (China) Mar. 27-31, 2017 (5 pages).

\* cited by examiner

METHOD FOR ASSOCIATING NETWORK FUNCTIONS WITH A NETWORK SLICE INSTANCE OF A MOBILE RADIO COMMUNICATION NETWORK

The present disclosure relates to communication methods for associating network functions with a network slice instance of a mobile radio communication network.

In the core network of a mobile radio communication network, it may be desirable to have multiple core network slice instances, e.g. to support different user classes (e.g. normal and premium users) or for load balancing (i.e. to avoid overload on a single network slice). The network slice instances may be provided for the same customer (e.g. a communication service provider, e.g. a video stream service) and may therefore be configured with the same Slice Service Type (SST), e.g. eMBB (Mobile Broadband) and the same Slice Differentiator (SD), e.g. an identification of the customer, e.g. the name or identification of an enterprise. It may also occur that a specific network slice is required for certain UEs (User Equipments) due to an agreement with a customer, e.g. due to the fact that the customer requires that a service is provided with components from a certain manufacturer. However, the Slice Service Type and the Slice Differentiator are not sufficient for an Network Slice Selection Function to route a UE to an appropriate network slice instance of multiple network slices unless the operator uses different Slice Differentiators for the network slice instances, e.g. for differentiating different groups of customers.

Accordingly, approaches for identifying network slice instances and associating network functions with network slice instances are desirable.

According to one embodiment, a method for associating network functions with a network slice instance of a mobile radio communication network is provided comprising an Network Slice Management Function, NSMF, creating an identifier for a network slice instance, NSI, for Operations Administration and Management, OAM, wherein the mobile radio communication network comprises a core network and an OAM system, wherein the OAM system comprises at least the NSMF which has interfaces to network functions in the core network, wherein the network functions provide a communication service to a mobile terminal and wherein the core network further comprises a Network Repository Function, NRF, that maintains an association of network functions and network slice instances of the mobile radio communication network and the NSMF or the NRF notifying one or more network functions of the network functions about their association with the network slice instance.

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
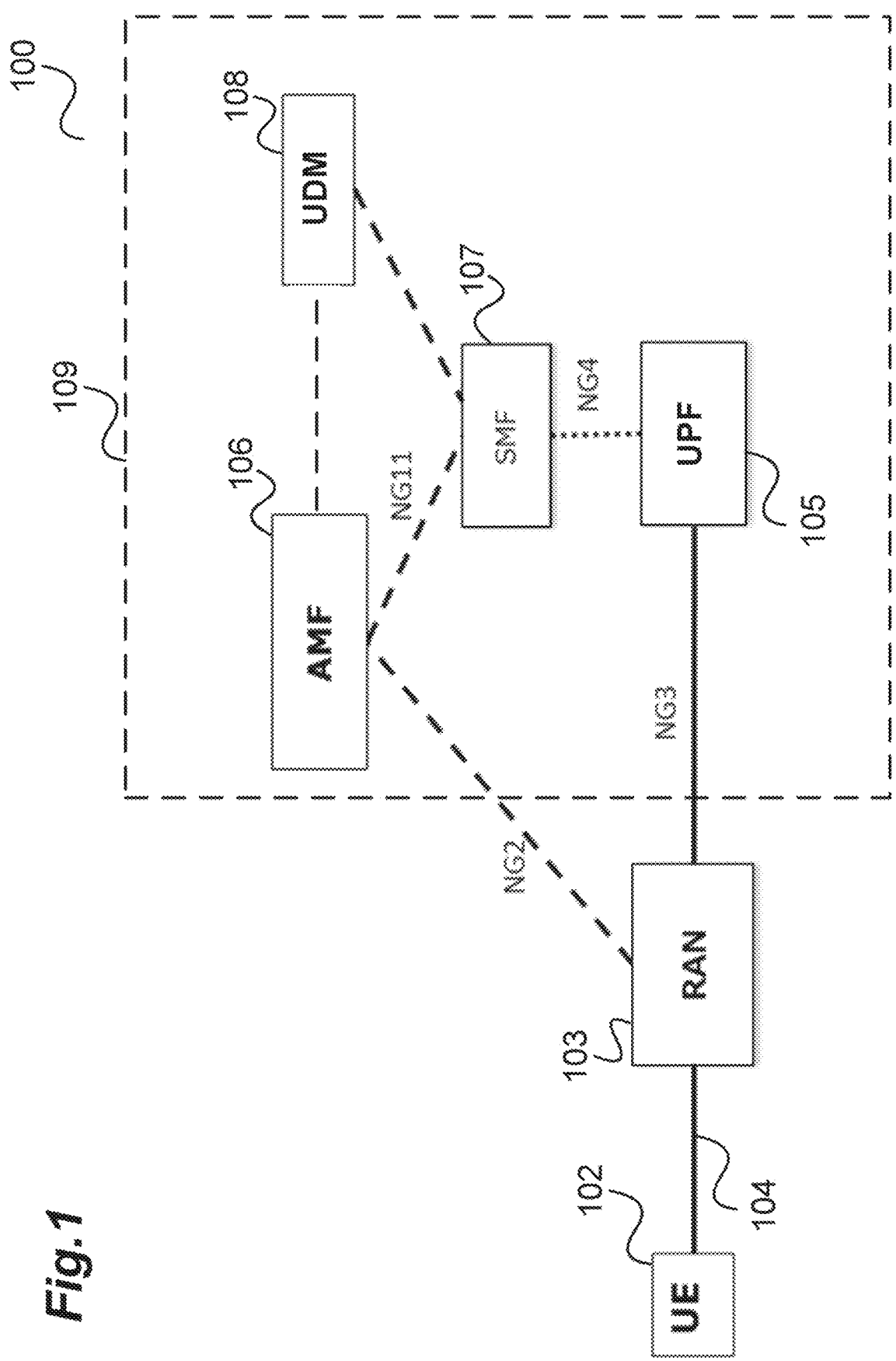
FIG. 1 shows a radio communication system.

FIG. 1 shows a radio communication system 100.

The radio communication system 100 includes a radio communication terminal device 102 such as a UE (user equipment), a nano equipment (NE), and the like.

Furthermore, the radio communication system 100 includes a radio access network 103, which may include a plurality of radio access network nodes, i.e. base stations configured to provide radio access in accordance with a 5G (Fifth Generation) radio access technology (5G New Radio). It should be noted that the radio communication system 100 may also be configured in accordance with LTE (Long Term Evolution) or another mobile radio communication standard but 5G is herein used as an example. Each radio access network node may provide a radio communication with the radio communication terminal device 102 over an air interface 104. It should be noted that the radio access network 103 may include any number of radio access network nodes.

The radio communication system 100 may further include a core network 109 including a UPF (user plane function) 105, connected to the RAN 103, an Access and Mobility Management Function (AMF) 106 connected to the RAN 103, a Session Management Function (SMF) 107 and a Unified Data Management (UDM) 108.

An operator may create multiple network slice instances of the core network 109. This is illustrated in FIG. 2.

Figure 2:
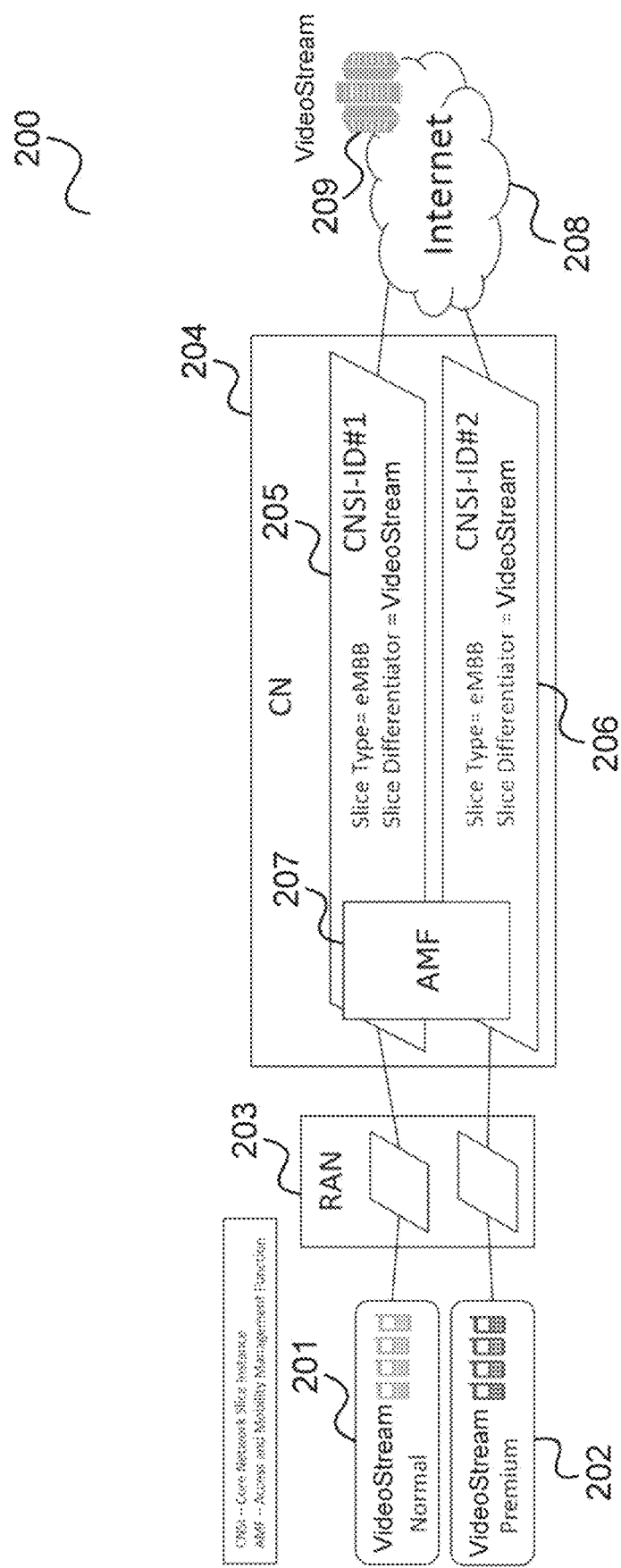
FIG. 2 shows a communication system with multiple core network slice instances.

FIG. 2 shows a communication system 200.

The communication system 200 includes sets of UEs 201, 202 which may communicate with a (e.g. 5G) RAN 203 (e.g. corresponding to RAN 103) which is connected to a core network 204 (e.g. corresponding to core network 109).

The core network 204 comprises a first core network instance (CNI, also referred to as network slice or network slice instance) 205 and a second core network instance (CNI) 206.

Typically, when a Network Slice is deployed, Network Functions (NFs) are instantiated, or (if already instantiated) referenced to form a Network Slice Instance (NSI) and network functions that belong to a Network Slice Instance are configured with a network slice instance identification.

The network slice instances 205, 206 may be of the same Slice Service Type (SST) and the same Slice Differentiator (SD). The network slice instance identification allows differentiating network slice instances of the same Slice Service Type and the same Slice Differentiator.

For example, an operator of the core network 204 may provide the network slice instances 205, 206 for the same enterprise providing some network service (e.g. a video streaming enterprise denoted "VideoStream" in FIG. 2) for various purposes such as customer differentiation (e.g. different user classes). For example, a first set 201 of UEs are UEs of normal users of the network service and a second set 202 of UEs are UEs of premium users of the network service. Another purpose for having multiple network slice instances may for example be load balancing (i.e. to avoid overload on a single network slice instance). In such an example, the Slice Type of the network slice instances 205, 206 may be eMBB (mobile broadband) and the Slice Differentiator may be the name of the enterprise ("VideoStream" in this example).

The network slice instances 205, 206 connect the UEs 201, 202 to the Internet 208 which comprises "VideoStream" Servers 209, e.g. providing video content to the UEs 201, 202 via the core network 204 and the RAN 203.

Each network slice instance 205, 206 has a network slice instance identification, in this example a CNSI-ID (Core Network Slice Instance Identification).

In the case of multiple network slice instances there may be a network function (NF) that is shared between multiple network slice instances. In the above example, an AMF 207 (e.g. corresponding to AMF 106) is shared by the network slice instances 205, 206. In case of an LTE (Long Term Evolution) network and an EPC (Evolved Packet Core) as core network 204, the AMF 106 may be an MME (Mobility Management Entity).

For supporting such a use case and in order to select and appropriate AMF and other NFs residing in the network slice instances (e.g. by the RAN 203 or by the UEs 201, 202 or by other NFs), the AMF 207 and other NFs of the network slice instances (e.g. SMFs and UPFs) need to know the CNSI-ID of the network slice instance they belong to, i.e. the CNSI-ID of the network slice instance they should support. Accordingly, a mechanism is needed by which a NF or NFs (e.g. AMF 207) is configured (at a certain point in time) with the CNSI-ID to support.

Figure 3:
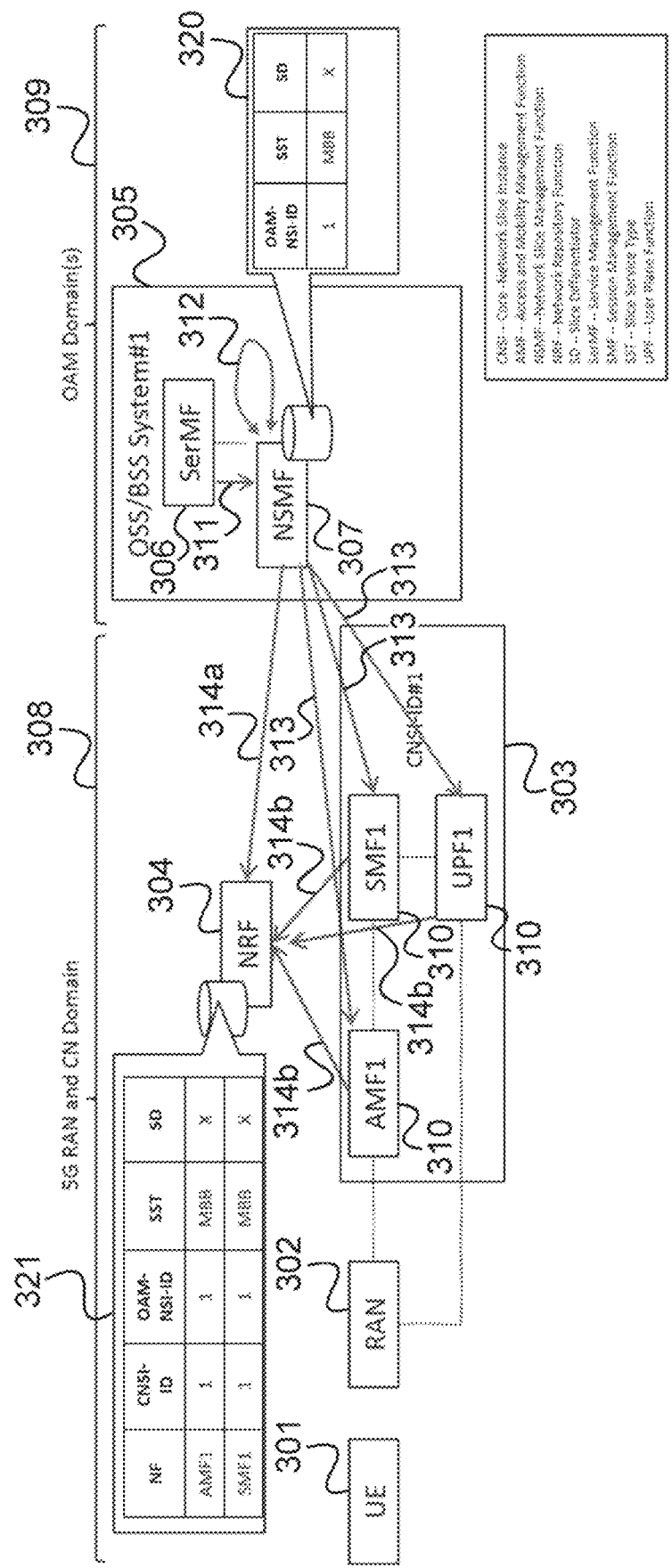
FIG. 3 shows a flow diagram illustrating an approach for notifying one or more network functions about their network slice instance.

FIG. 3 shows a flow diagram 300 illustrating an approach for notifying one or more network functions about their network slice instance or, in other words, for associating one or more network functions with a network slice instance.

The flow takes place in a radio communication system comprising a UE 301, a RAN 302, a core network slice instance (CNSI) 303 (e.g. corresponding to one of UEs 201, 202, RAN 203, and one of core network slice instances 205, 206) as well as an NRF (Network Repository Function) 304 and an OSS/BSS System (Operations Support System/Business Support System) 305.

The OSS/BSS System 305 comprises a Service Management Function (SerMF) 306 and a Network Slice Management Function (NSMF) 307.

The UE 301, the RAN 302, the CNSI 303 and the NRF 304 can be seen to belong to the (e.g. 5G) RAN and CN domain 308 and the OSS/BSS System 305 can be seen to belong to the OAM (Operations Administration and Management) domain 309.

The flow is described in the following.

In 311, the Service Management Function (SerMF) 306 requests for a network slice to serve MBB Service of an enterprise "X".

In 312, the NSMF 307 instantiates the network slice 303 and creates an identification OAM-NSI-ID#1 for the network slice 303. The NSMF 307 stores an association of OAM-NSI-IDs to SSTs and SDs in form of a first table 320.

In 313, the NSMF 307 instantiates NFs 310 necessary for the network slice 303.

In 314 option a (via OAM), the NSMF 307 informs the NRF 304 about the new network functions 310 and the corresponding OAM-NSI-ID, e.g. in the form of an association OAM-NSI-ID#1→[AMF1, SMF1, UPF1].

The NRF 304 stores an association of the NFs with the OAM-NSI-IDs to which they belong, the corresponding CNSI-IDs and SSTs and SDs in form of a second table 321. It may then inform the NFs 310 about the CNSI they are to support by means of CNSI-ID#1.

In 314 option b each of the network functions 310 (SMF, AMF, UPF) informs the NRF 304 about its availability and capabilities. The NRF 304 responds to the network function 301 with the CNSI-ID that the network function 310 belongs to (CNSI-ID#1).

In other words, in this example, the NRF 304 informs the NFs 310 about the CNSI they are to support (by means of the CNSI-ID). Alternatively, one or more of the NFs 310 (e.g. the AMF) may be informed by one of NFs 310 about the CNSI they are to support. For example, one of the NFs 310 like the SMF or the UPF (which is itself informed about the CNSI it is to support by the NRF) may inform the AMF that the NF has been created and that the AMF is to support the CNSI that the NF supports. Thus, the information about a CNSI to support may also be transmitted via a mutual interface between AMF and SMF.

Figure 4:
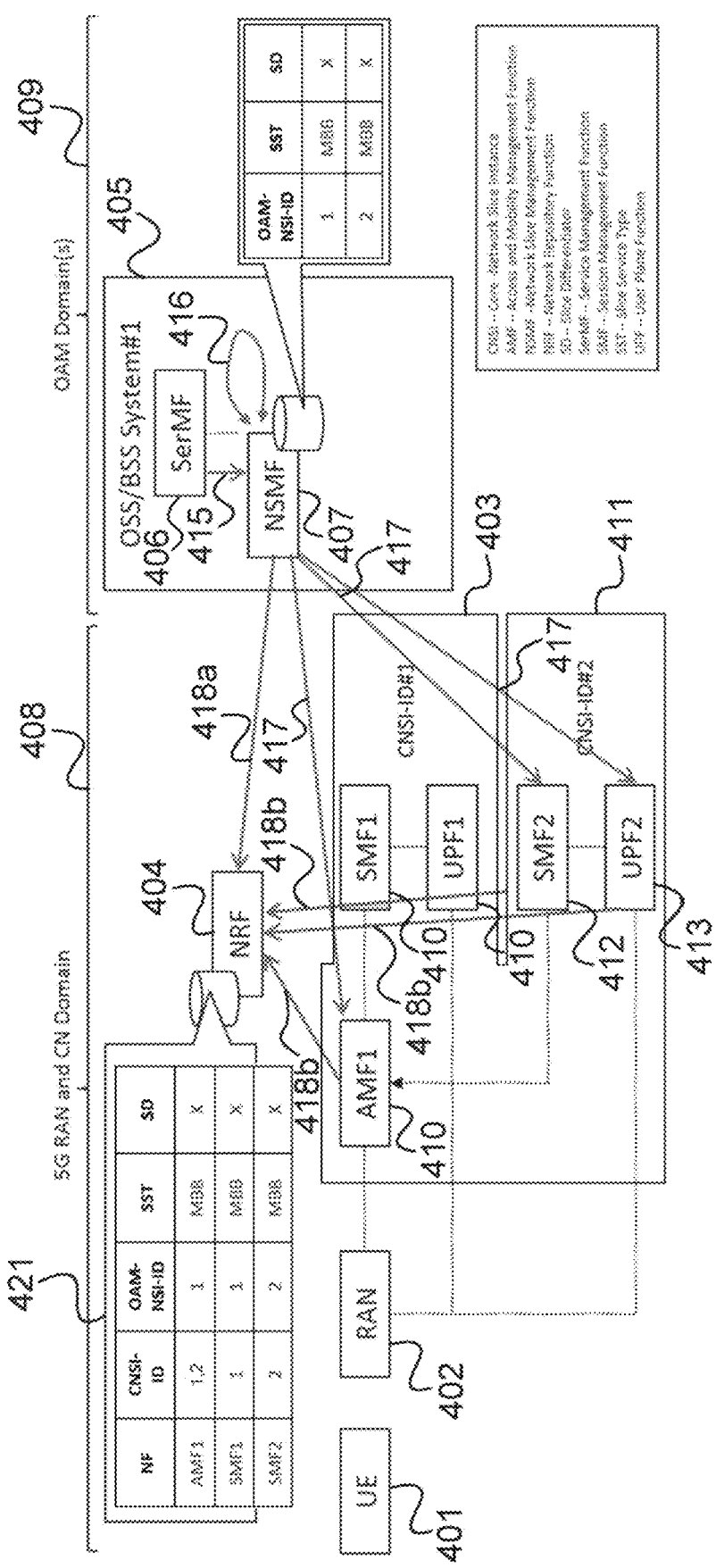
FIG. 4 shows a flow diagram illustrating a continuation of the flow of FIG. 3 for the case that an additional network slice instance is created.

FIG. 4 shows a flow diagram 400 illustrating a continuation of the flow of FIG. 3 for the case that an additional network slice instance is created, i.e. for notifying one or more network functions of an additional network slice instance about their network slice instance.

Similarly to FIG. 3, the flow takes place in a radio communication system comprising a UE 401, a RAN 402, a first core network slice instance 403 (corresponding to the CNSI 303 of FIG. 3), an additional second core network slice instance 411 and an NRF 404 (of a RAN and CN domain 408) and an OSS/BSS System 405 (of an OAM domain 409), wherein the OSS/BSS System 405 comprises a Service Management Function 406 and a Network Slice Management Function 407.

In 415, the second CNSI 411 with the same slice type (MBB) and for the same enterprise ("X") as the first CNSI 403 is requested to be created by the SerMF 406.

In 416, the NSMF 407 instantiates the second CNSI 411 and creates an identification OAM-NSI-ID#2 for the second CNSI 411. The NSMF 407 stores an association of OAM-NSI-IDs to SSTs and SDs in form of a first table 420.

In 417, in this example, due to a corresponding policy, the NSMF 407 determines that the AMF 410 of the first CNSI 403 can be reused for the second CNSI 411. Hence, only a SMF 412 and an UPF 413 are instantiated for the second CNSI 411.

In 418 option a (via OAM), the NSMF 407 informs the NRF 404 about the new network functions 412, 413 and the corresponding OAM-NSI-ID, e.g. in form of an association OAM-NSI-ID#2→[AMF1, SMF2, UPF2].

The NRF 404 stores an association of NFs with the OAM-NSI-IDs to which they belong, the corresponding CNSI-IDs and SSTs and SDs in form of a second table 421.

In 418 option b the SMF 412, the UPF 413 and the AMF 410 inform the NRF 404 about their availability and capabilities. In response, the NRF 404 notifies the SMF 412, the UPF 413 and the AMF 410 that they should support the network slice instance with CNSI-ID CNSI-ID#2.

Like in context of FIG. 3, one of the NFs 412, 413 may inform another NF 412, 413 or the AMF 410 that it should support the second CNSI 411.

Figure 5:
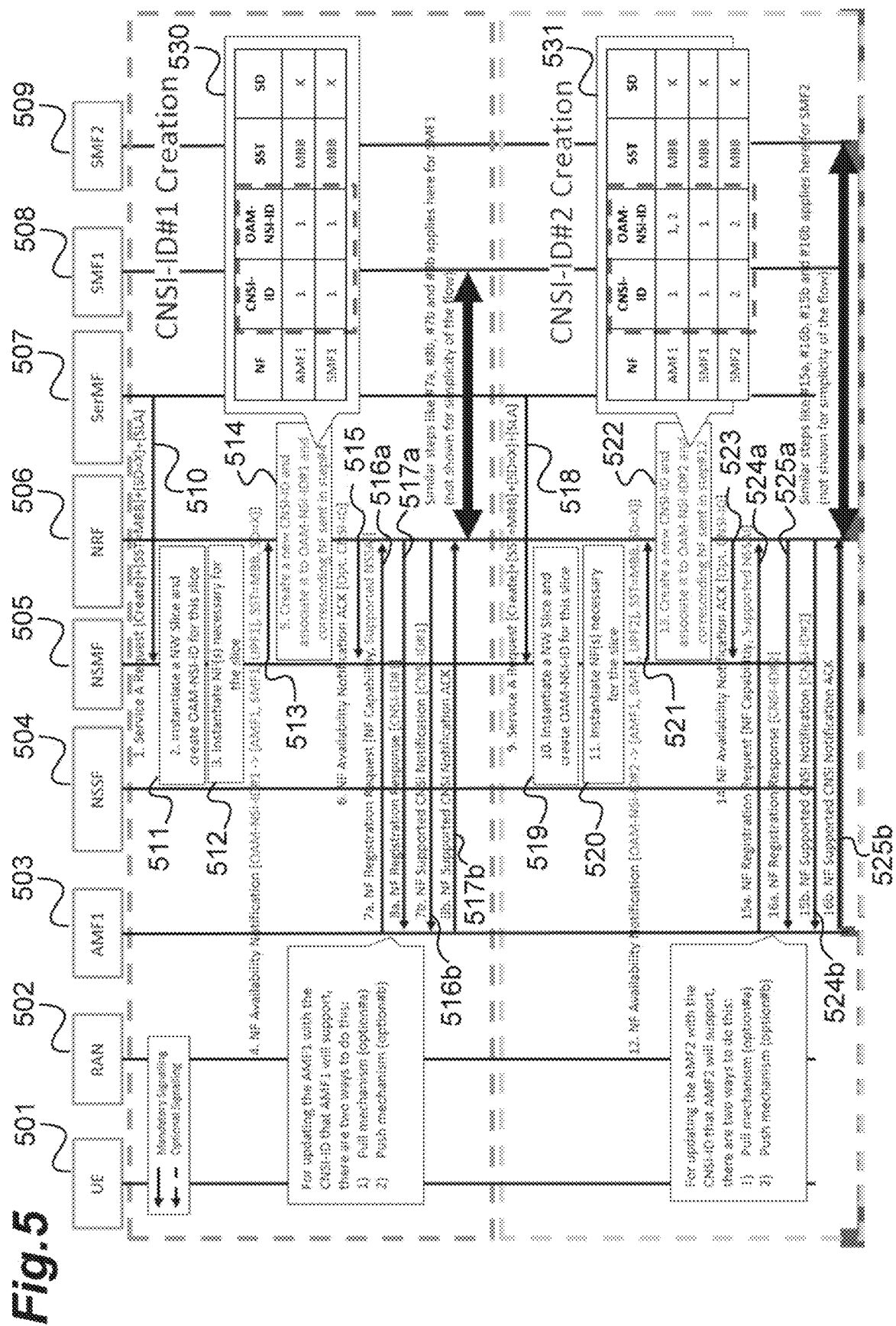
FIG. 5 shows an example of the flow of FIGS. 3 and 4 in more detail.

FIG. 5 shows an example of the flow of FIGS. 3 and 4 for option a for 314 and 418 in more detail.

The flow takes place between a UE 501 (corresponding to UE 301, 401), a RAN 502 (corresponding to RAN 302, 402), an AMF 503 (corresponding to AMF 310, 410), a Network Slice Selection Function (NSSF) 504, an NSMF 505 (corresponding to NSMF 307, 407), an NRF 506 (corresponding to NRF 304, 404), an SerMF 507 (corresponding to SerMF 306, 406), a first SMF 508 (corresponding to the SMF of the first CNSI 303, 403) and a second SMF 509 (corresponding to the SMF of the second CNSI 411).

In 510, the SerMF 507 sends a service request for the creation of a network slice instance to the NSMF 505. This may include an indication of the SST and the SD and a Service Level Agreement (SLA).

In 511, the NSMF 505 instantiates a network slice and creates an OAM-NSI-ID (OAM-NSI-ID#1) for the network slice instance.

In 512, the NSMF 505 instantiates one or more network functions necessary for the network slice instance.

In 513, according to 314 option a, the NSMF 505 informs the NRF 506 about the availability of the instantiated one or more network functions and their association with OAM-NSI-ID#1.

In 514, the NRF creates a new CNSI-ID (CNSI-ID#1) for the network slice instance (CNSI-ID#1) and associates it with OAM-NSI-ID#1 in a first table 530.

In 515, the NRF 506 acknowledges the NF availability notification of 513. In this ACK message, the NRF may include CNSI-ID#2.

In 516a, the AMF 503 sends an NF registration request to the NRF 506. This may include NF capability information and the supported Network Slice Selection Assistance Information (e.g. a list of SSTs and SDs). The AMF may be configured with this NSSAI, when the AMF was instantiated by the NSMF.

In 517a, the NRF responds with an NF registration response indicating the CNSI-ID to which the AMF 503 belongs (i.e. with which it is associated).

516a and 517a can be seen as a pull approach for notifying the AMF 503 about its CNSI-ID. Similar pull mechanisms may be used by the first SMF 508 and other NFs (e.g. an UPF) to obtain information about their CNSI-ID.

Alternatively to 516a and 517a, a push approach may be used in 516b and 517b.

Specifically, in 517b, the NRF 506 sends a Supported CNSI Notification to the AMF 503 indicating that the AMF 503 is to support the CNSI with CNSI-ID#1 and in 518b the AMF 503 acknowledges this notification.

Similar push mechanisms may be used for the first SMF 508 and other NFs (e.g. an UPF) to provide information about their CNSI-ID.

In 518, for creating an additional (second) CNSI the SerMF 507 sends again a service request for the creation of a network slice instance to the NSMF 505. This may include an indication of the SST and the SD and a Service Level Agreement (SLA).

In 519, the NSMF 505 again instantiates a network slice and creates an OAM-NSI-ID (OAM-NSI-ID#2) for the second network slice instance.

In 520, the NSMF 505 instantiates one or more network functions necessary for the second network slice instance.

In 521, according to 314 option a, the NSMF 505 informs the NRF 506 about the availability of the instantiated one or more network functions and their association with OAM-NSI-ID#2.

In 522, the NRF creates a new CNSI-ID (CNSI-ID#2) for the network slice instance (CNSI-ID#2) and associates it with OAM-NSI-ID#2 in a second table 531 (update of first table 530).

In 523, the NRF 506 acknowledges the NF availability notification of 521. In this ACK message, the NRF may include CNSI-ID#2.

In 524a, the AMF 503 sends an NF registration request to the NRF 506. This may include NF capability information and the supported Network Slice Selection Assistance Information (e.g. a list of SSTs and SDs). The AMF may be configured with this NSSAI, when the AMF was instantiated by the NSMF.

In 525a, the NRF responds with an NF registration response indicating the CNSI-ID to which the AMF 503 belongs (i.e. with which it is associated). 524a and 525a can be seen as a pull approach for notifying the AMF 503 about its CNSI-ID. Similar pull mechanisms may be used by the second SMF 509 and other NFs (e.g. an UPF) to obtain information about their CNSI-ID.

Alternatively to 524a and 525a, a push approach may be used in 524b and 525b.

Specifically, in 525b, the NRF 506 sends a Supported CNSI Notification to the AMF 503 indicating that the AMF 503 is to support the CNSI with CNSI-ID#2 and in 525b the AMF 503 acknowledges this notification.

Similar push mechanisms may be used for the second SMF 509 and other NFs (e.g. an UPF) to provide information about their CNSI-ID.

Figure 6:
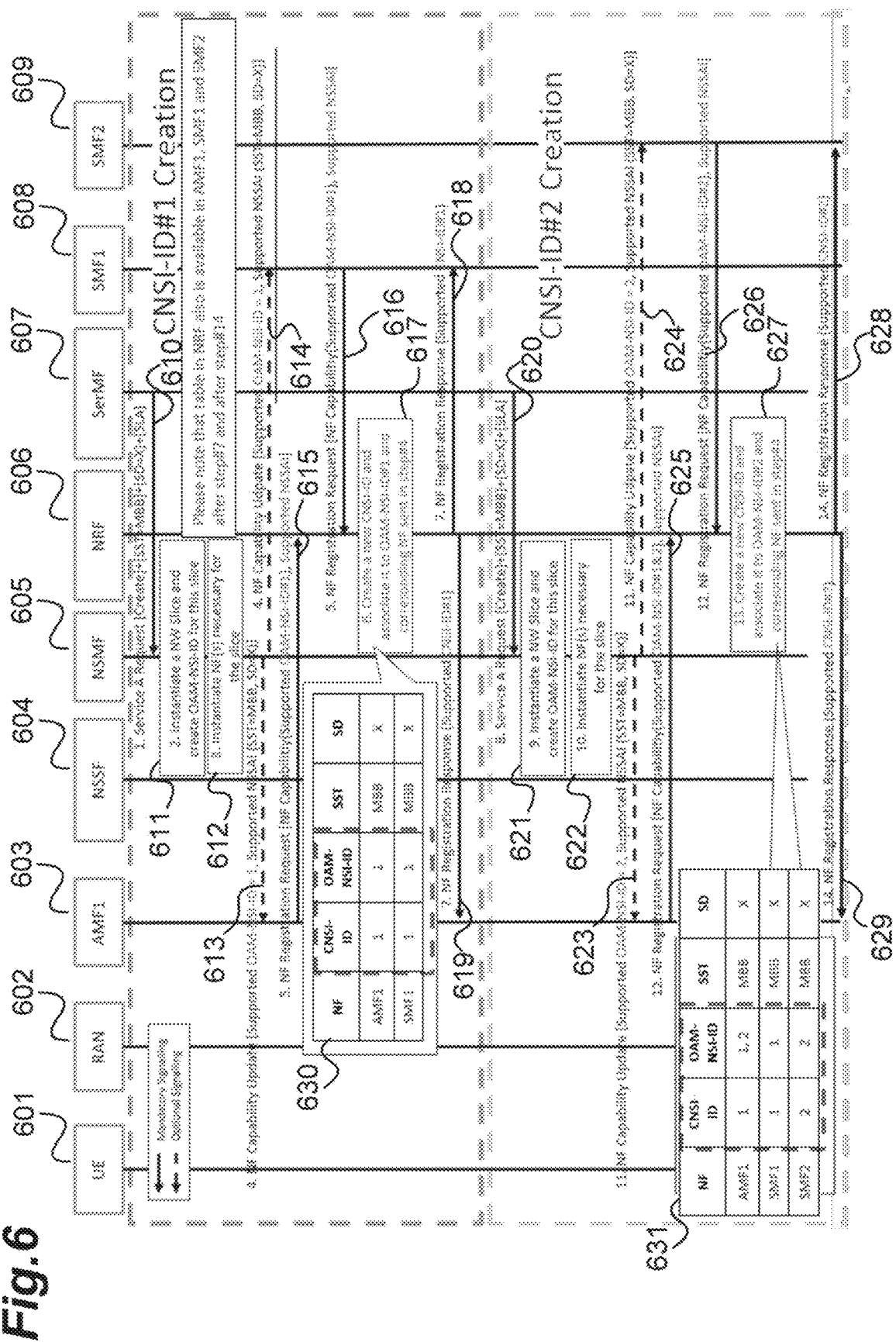
FIG. 6 shows another example of the flow of FIGS. 3 and 4 in more detail.

FIG. 6 shows an example of the flow of FIGS. 3 and 4 for option b for 314 and 418 in more detail.

Similarly to FIG. 5, the flow takes place between a UE 601 (corresponding to UE 301, 401), a RAN 602 (corresponding to RAN 302, 402), an AMF 603 (corresponding to AMF 310, 410), a Network Slice Selection Function (NSSF) 604, an NSMF 605 (corresponding to NSMF 307, 407), an NRF 606 (corresponding to NRF 304, 404), an SerMF 607 (corresponding to SerMF 306, 406), a first SMF 608 (corresponding to the SMF of the first CNSI 303, 403) and a second SMF 609 (corresponding to the SMF of the second CNSI 411).

In 610, the SerMF 607 sends a service request for the creation of a network slice instance to the NSMF 605. This may include an indication of the SST and the SD and a Service Level Agreement (SLA).

In 611, the NSMF 605 instantiates a network slice and creates an OAM-NSI-ID (OAM-NSI-ID#1) for the network slice instance.

In 612, the NSMF 605 instantiates one or more network functions necessary for the network slice instance.

In 613, the NSMF 605 sends an NF Capability Update to the AMF 603 indicating that the AMF 603 is to support the network slice instance with OAM-NSI-ID#1.

In 614, the NSMF 605 sends an NF Capability Update to the first SMF 608 indicating that the first SMF 608 is to support the network slice instance with OAM-NSI-ID#1.

In 615, according to 314 option b, the AMF 603 sends an NF Registration Request to the NRF 606 indicating that it supports the network slice instance with OAM-NSI-ID#1.

In 616, according to 314 option b, the first SMF 608 sends an NF Registration Request to the NRF 606 indicating that it supports the network slice instance with OAM-NSI-ID#1.

In 617, the NRF 606 creates a new CNSI-ID (CNSI-ID#1) for the network slice instance and associates it with OAM-NSI-ID#1 and stores it in a first table 630.

In 618, according to 314 option b, the NRF 606 notifies the first SMF 608 that it is associated with the network slice instance CNSI-ID#1.

In 619, according to 314 option b, the NRF 606 notifies the AMF 603 that it is associated with the network slice instance CNSI-ID#1.

In 620, the SerMF 607 sends a service request for the creation of a network slice instance to the NSMF 605. This may include an indication of the SST and the SD and a Service Level Agreement (SLA).

In 621, the NSMF 605 instantiates a network slice and creates an OAM-NSI-ID (OAM-NSI-ID#2) for the network slice instance.

In 622, the NSMF 605 instantiates one or more network functions necessary for the network slice instance.

In 623, the NSMF 605 sends an NF Capability Update to the AMF 603 indicating that the AMF 603 is to support the network slice instance with OAM-NSI-ID#2.

In 624, the NSMF 605 sends an NF Capability Update to the second SMF 609 indicating that the second SMF 609 is to support the network slice instance with OAM-NSI-ID#2.

In 625, according to 314 option b, the AMF 603 sends an NF Registration Request to the NRF 606 indicating that it supports the network slice instance with OAM-NSI-ID#2.

In 626, according to 314 option b, the second SMF 609 sends an NF Registration Request to the NRF 606 indicating that it supports the network slice instance with OAM-NSI-ID#2.

In 627, the NRF 606 creates a new CNSI-ID (CNSI-ID#2) for the network slice instance and associates it with OAM-NSI-ID#2 and stores it in a second table 631 (update of first table 630).

In 629, according to 314 option b, the NRF 606 notifies the second SMF 609 that it is associated with the network slice instance CNSI-ID#2.

In 628, according to 314 option b, the NRF 606 notifies the AMF 603 that it is associated with the network slice instance CNSI-ID#2.

In the approach of FIG. 3, the OAM domain 309 network slice identification OAM-NSI-ID and the RAN and CN domain 308 uses another network slice identification CNSI-ID. This may be desirable if the core network is covered by multiple OSS/BSS systems to avoid conflicts.

Figure 7:
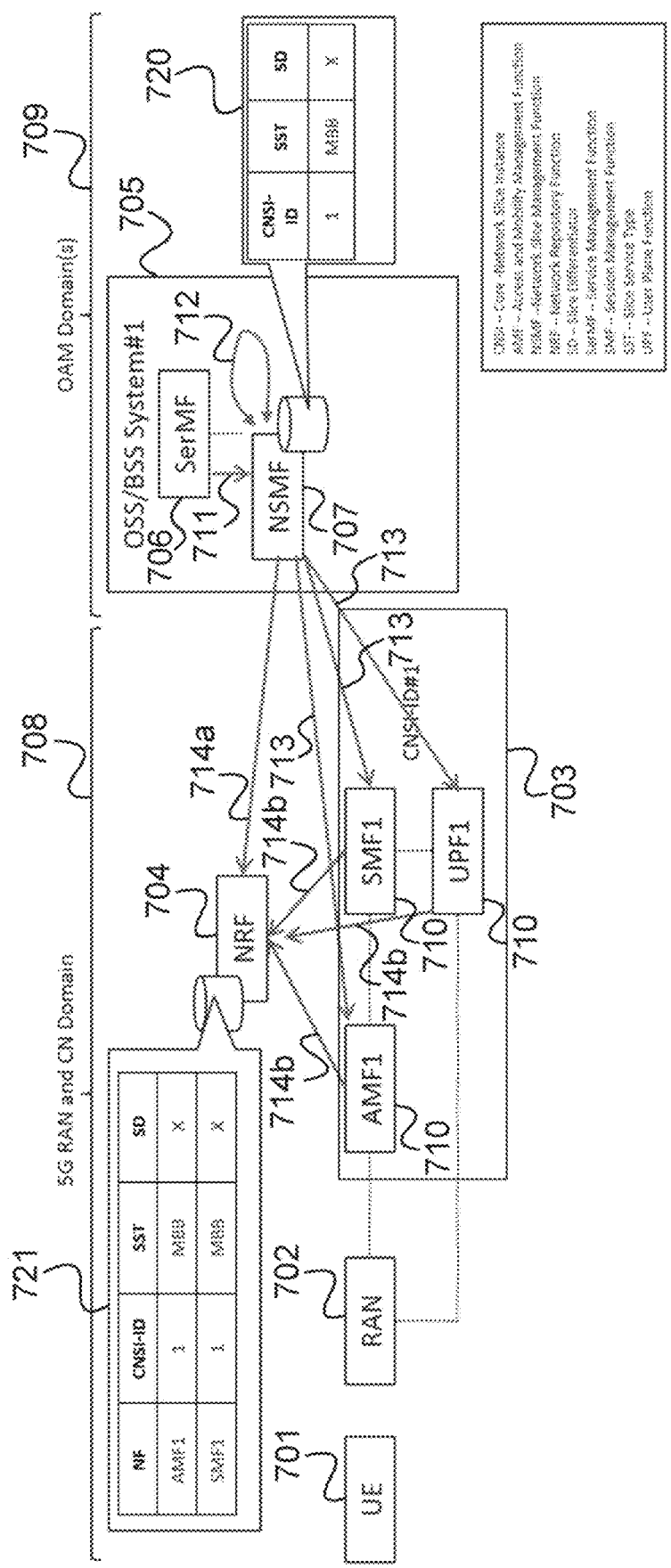
FIG. 7 shows a flow diagram illustrating an approach for notifying one or more network functions about their network slice instance wherein the CN (core network) domain and the OAM (Operations Administration and Management) domain use the same identification for the network slice instance.

FIG. 7 shows a flow diagram 700 illustrating an approach for notifying one or more network functions about their network slice instance wherein the RAN and CN domain and the OAM domain use the same identification. This does not preclude the case, where the RAN may also use the same identification for the network slice instance as of the CN domain and the OAM domain.

Similarly to FIG. 3, the flow takes place in a radio communication system comprising a UE 701, a RAN 702, a core network slice instance (CNSI) 703 (e.g. corresponding to one of UEs 201, 202, RAN 203, and one of core network slice instances 205, 206) as well as an NRF (Network Repository Function) 704 and an OSS/BSS System (Operations Support System/Business Support System) 705.

The OSS/BSS System 705 comprises a Service Management Function (SerMF) 706 and a Network Slice Management Function (NSMF) 707.

The UE 701, the RAN 702, the CNSI 703 and the NRF 704 can be seen to belong to the (e.g. 5G) RAN and CN domain 708 and the OSS/BSS System 705 can be seen to belong to the OAM (Operations Administration and Management) domain 709.

The flow is described in the following.

In 711, the Service Management Function (SerMF) 706 requests for a network slice to serve MBB Service of an enterprise "X".

In 712, the NSMF 707 instantiates the network slice 703 and creates an identification CNSI-ID#1 for the network slice 703. The NSMF 707 stores an association of CNSI-IDs to SSTs and SDs in form of a first table 720.

In 713, the NSMF 707 instantiates NFs 710 necessary for the network slice 703. Furthermore, the NSMF 707 configures the NFs 710 with the CNSI-ID#1 as the identification of the network slice to support.

In other words, in this example, the NSMF 707 (i.e. the OAM domain) informs the NFs 710 about the CNSI they are to support (by means of the CNSI-ID). Alternatively, one or more of the NFs 710 (e.g. the AMF) may be informed by one of NFs 710 about the CNSI they are to support. For example, one of the NFs 710 like the SMF or the UPF (which is itself informed about the CNSI it is to support by the NSMF) may inform the AMF that the NF has been created and that the AMF is to support the CNSI that the NF supports. Thus, the information about a CNSI to support may also be transmitted via a mutual interface between AMF and SMF.

In 714 option a (via OAM), the NSMF 707 informs the NRF 704 about the new network functions 710 and the corresponding CNSI-ID, e.g. in the form of associations AMF1→CNSI-ID#1, SMF→CNSI-ID#1, UPF1→CNSI-ID#1.

The NRF 704 stores an association of the NFs with the CNSI-IDs to which they belong and SSTs and SDs in form of a second table 721. It may then inform the NFs 710 about the CNSI they are to support by means of CNSI-ID#1.

In 714 option b each of the network functions 710 (SMF, AMF, UPF) informs the NRF 704 about its availability and capabilities, e.g. which network slice type and which CNSI-ID they support.

Figure 8:
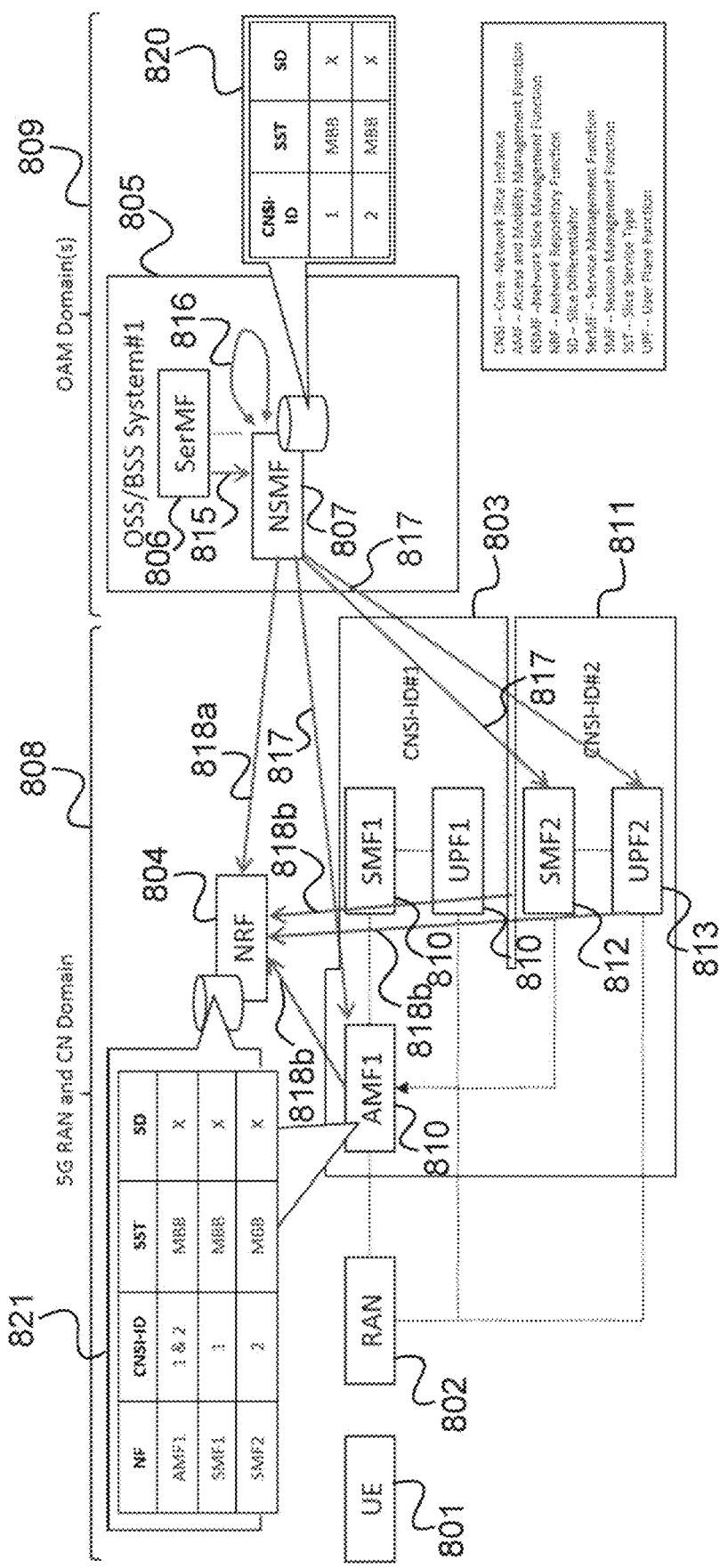
FIG. 8 shows a flow diagram illustrating a continuation of the flow of FIG. 7 for the case than an additional network slice instance is created.

FIG. 8 shows a flow diagram 800 illustrating a continuation of the flow of FIG. 7 for the case than an additional network slice instance is created, i.e. for notifying one or more network functions of an additional network slice instance about their network slice instance.

Similarly to FIG. 7, the flow takes place in a radio communication system comprising a UE 801, a RAN 802, a first core network slice instance 803 (corresponding to the CNSI 703 of FIG. 7), an additional second core network slice instance 811 and an NRF 804 (of a RAN and CN domain 808) and an OSS/BSS System 805 (of an OAM domain 809), wherein the OSS/BSS System 805 comprises a Service Management Function 806 and a Network Slice Management Function 807.

In 815, the second 811 CNSI with the same slice type (MBB) and for the same enterprise ("X") as the first CNSI 803 is requested to be created by the SerMF 806.

In 816, the NSMF 807 instantiates the second CNSI 811 and creates an identification CNSI-ID#2 for the second CNSI 811 for its OAM purpose. The NSMF 807 stores an association of CNSI-IDs to SSTs and SDs in form of a first table 820.

In 817, in this example, due to a corresponding policy, the NSMF 807 determines that the AMF 810 of the first CNSI 803 can be reused for the second CNSI 811. Hence, only a SMF 812 and an UPF 813 are instantiated for the second CNSI 811. The NSMF 807 configures the AMF 810, SMF 812 and UPF 813 to support the network slice instance with CNSI-ID#2.

In 818 option a (via OAM), the NSMF 807 informs the NRF 804 about the new network functions 812, 813 and the corresponding CNSI-ID, e.g. in the form of associations AMF1→CNSI-ID#2, SMF→CNSI-ID#2, UPF1→CNSI-ID#2.

In 818 option b the SMF 812, the UPF 813 and the AMF 810 inform the NRF 804 about their availability and capabilities e.g. which network slice type and which CNSI-ID they support.

The NRF 804 stores an association of NFs with the CNSI-IDs to which they belong and the SSTs and the SDs in form of a second table 821.

Like in context of FIG. 7, one of the NFs 812, 813 may inform another NF 812, 813 or the AMF 810 that it should support the second CNSI 811.

Figure 9:
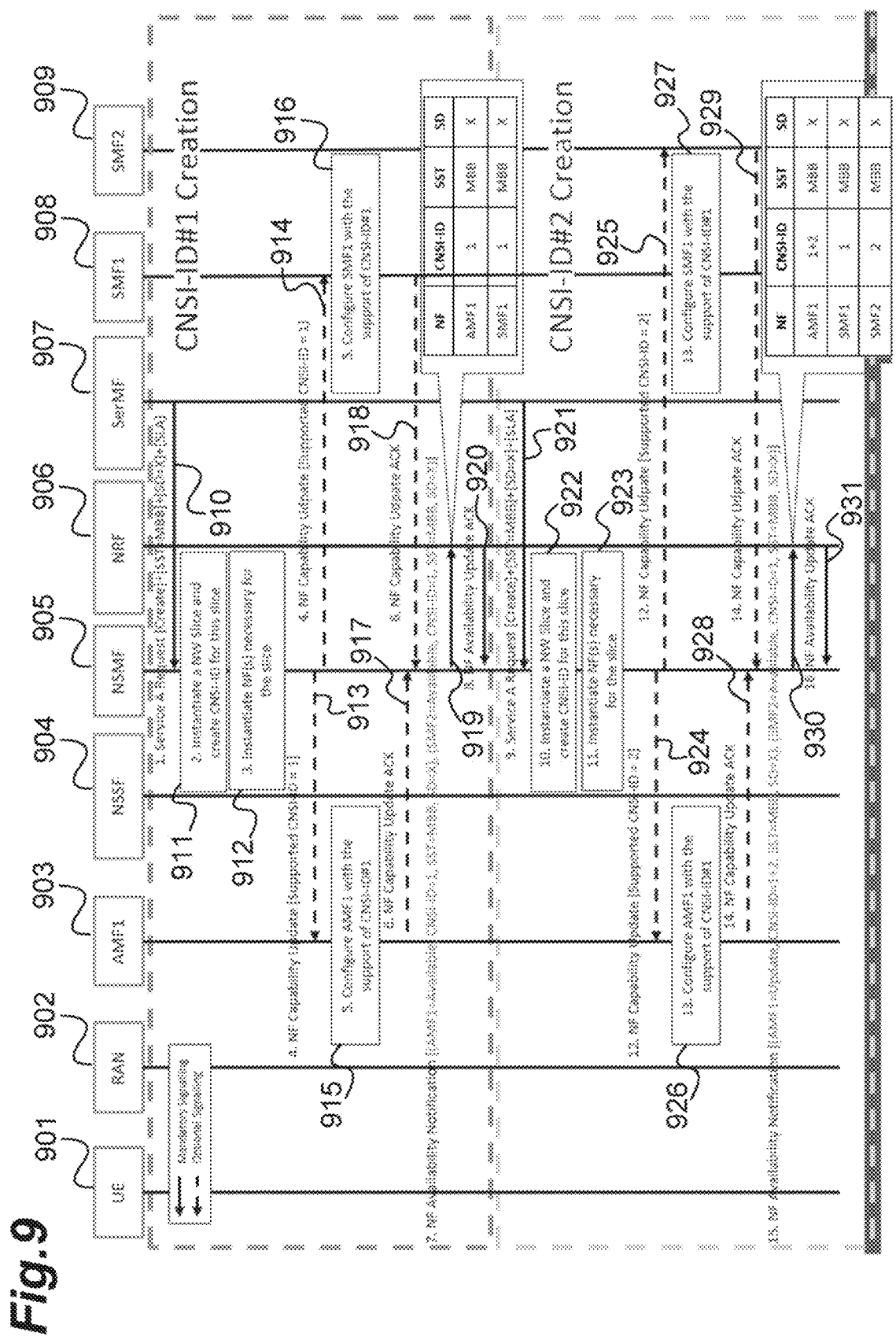
FIG. 9 shows an example of the flow of FIGS. 7 and 8 in more detail.

FIG. 9 shows an example of the flow of FIGS. 7 and 8 for option a for 714 and 818 in more detail.

The flow takes place between a UE 901 (corresponding to UE 701, 801), a RAN 902 (corresponding to RAN 702, 802), an AMF 903 (corresponding to AMF 710, 810), a Network Slice Selection Function (NSSF) 904, an NSMF 905 (corresponding to NSMF 707, 807), an NRF 906 (corresponding to NRF 704, 804), an SerMF 907 (corresponding to SerMF 706, 806), a first SMF 908 (corresponding to the SMF of the first CNSI 703, 803) and a second SMF 909 (corresponding to the SMF of the second CNSI 811).

In 910, the SerMF 907 sends a service request for the creation of a network slice instance to the NSMF 905. This may include an indication of the SST and the SD and a Service Level Agreement (SLA).

In 911, the NSMF 905 instantiates a network slice and creates a CNSI-ID (CNSI-ID#1) for the network slice instance.

In 912, the NSMF 905 instantiates one or more network functions necessary for the network slice instance.

In 913 and 914, the NSMF sends an NF Capability Update to the AMF 903 and the first SMF 908 (and possibly one or more further initiated network functions) to inform them about the CNSI-ID of the network slice instance to support (CNSI-ID#1).

In 915, the AMF 903 is configured to support the network slice instance CNSI-ID#1.

In 916, the first SMF 908 is configured to support the network slice instance CNSI-ID#1.

In 917, the AMF 903 acknowledges the NF Capability Update of 913.

In 918, the first SMF 908 acknowledges the NF Capability Update of 914.

In 919, according to 714 option a, the NSMF 905 informs the NRF 906 about the availability of the instantiated one or more network functions and their association with CNSI-ID#1.

In 920, the NRF 906 acknowledges the NF availability notification of 913.

In 921, for creating an additional (second) CNSI the SerMF 907 sends again a service request for the creation of a network slice instance to the NSMF 905. This may include an indication of the SST and the SD and a Service Level Agreement (SLA).

In 922, the NSMF 905 again instantiates a network slice and creates a CNSI-ID (CNSI-ID#2) for the second network slice instance.

In 923, the NSMF 905 instantiates one or more network functions necessary for the second network slice instance.

In 923 and 924, the NSMF sends an NF Capability Update to the AMF 903 and the second SMF 909 (and possibly one or more further initiated network functions) to inform them about the CNSI-ID of the network slice instance to support (CNSI-ID#2).

In 925, the AMF 903 is configured to support the network slice instance CNSI-ID#2.

In 926, the second SMF 909 is configured to support the network slice instance CNSI-ID#2.

In 927, the AMF 903 acknowledges the NF Capability Update of 925.

In 928, the second SMF 909 acknowledges the NE Capability Update of 926.

In 929, according to 714 option a, the NSMF 905 informs the NRF 906 about the availability of the instantiated one or more network functions and their association with CNSI-ID#2.

In 930, the NRF 906 acknowledges the NE availability notification of 913.

Figure 10:
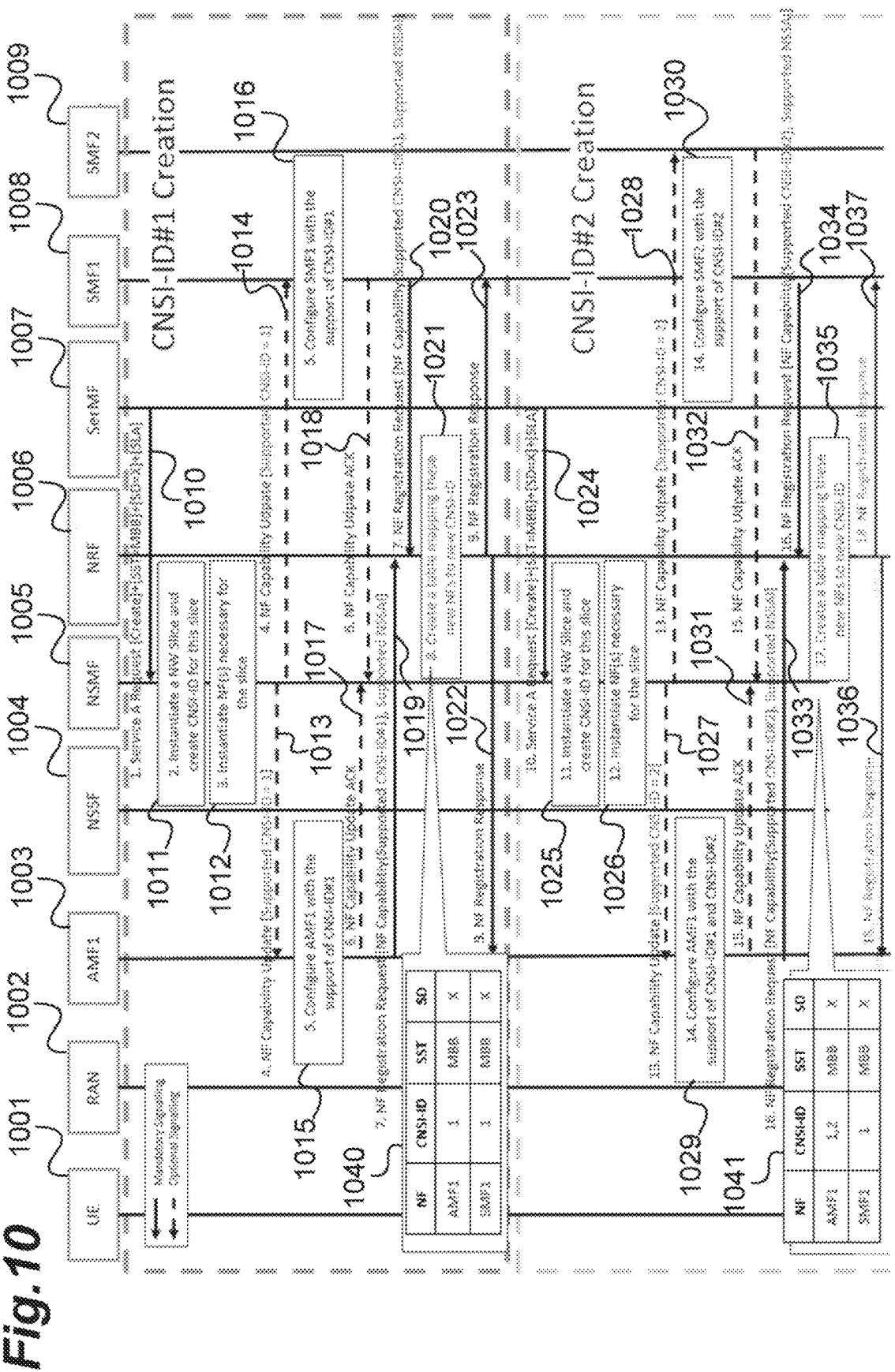
FIG. 10 shows another example of the flow of FIGS. 7 and 8 in more detail.

FIG. 10 shows an example of the flow of FIGS. 7 and 8 for option b for 714 and 818 in more detail.

Similarly to FIG. 9, the flow takes place between a UE 1001 (corresponding to UE 701, 801), a RAN 1002 (corresponding to RAN 702, 802), an AMF 1003 (corresponding to AMF 710, 810), a Network Slice Selection Function (NSSF) 1004, an NSMF 1005 (corresponding to NSMF 707, 807), an NRF 1006 (corresponding to NRF 704, 804), an SerMF 1007 (corresponding to SerMF 706, 806), a first SMF 1008 (corresponding to the SMF of the first CNSI 703, 803) and a second SMF 1009 (corresponding to the SMF of the second CNSI 811).

In 1010, the SerMF 1007 sends a service request for the creation of a network slice instance to the NSMF 1005. This may include an indication of the SST and the SD and a Service Level Agreement (SLA).

In 1011, the NSMF 1005 instantiates a network slice and creates a CNSI-ID (CNSI-ID#1) for the network slice instance.

In 1012, the NSMF 1005 instantiates one or more network functions necessary for the network slice instance.

In 1013 and 1014, the NSMF sends an NF Capability Update to the AMF 1003 and the first SMF 1008 (and possibly one or more further initiated network functions) to inform them about the CNSI-ID of the network slice instance to support (CNSI-ID#1).

In 1015, the AMF 1003 is configured to support the network slice instance CNSI-ID#1.

In 1016, the first SMF 1008 is configured to support the network slice instance CNSI-ID#1.

In 1017, the AMF 1003 acknowledges the NF Capability Update of 1013.

In 1018, the first SMF 1008 acknowledges the NF Capability Update of 1014.

In 1019, according to 714 option b, the AMF 1003 sends an NF Registration Request to the NRF 1006 indicating that it supports the network slice instance with NSI-ID#1.

In 1020, according to 714 option b, the first SMF 1008 sends an NF Registration Request to the NRF 1006 indicating that it supports the network slice instance with NSI-ID#1.

In 1021, the NRF 1006 associates both AMF 1003 and SMF 1008 with NSI-ID#1 and stores it in a first table 1040.

In 1022, according to 714 option b, the NRF 1006 responds that the AMF 1003 is associated with the network slice instance CNSI-ID#1.

In 1023, according to 714 option b, the NRF 1006 responds that the first SMF 1008 is associated with the network slice instance CNSI-ID#1.

In 1024, for creating an additional (second) CNSI the SerMF 1007 sends again a service request for the creation of a network slice instance to the NSMF 1005. This may include an indication of the SST and the SD and a Service Level Agreement (SLA).

In 1025, the NSMF 1005 again instantiates a network slice and creates a CNSI-ID (CNSI-ID#2) for the second network slice instance.

In 1026, the NSMF 1005 instantiates one or more network functions necessary for the second network slice instance.

In 1027 and 1028, the NSMF sends an NF Capability Update to the AMF 1003 and the second SMF 1009 (and possibly one or more further initiated network functions) to inform them about the CNSI-ID of the network slice instance to support (CNSI-ID#2).

In 1029, the AMF 1003 is configured to support the network slice instance CNSI-ID#2.

In 1030, the second SMF 1009 is configured to support the network slice instance CNSI-ID#2.

In 1031, the AMF 1003 acknowledges the NF Capability Update of 1029.

In 1032, the second SMF 1009 acknowledges the NF Capability Update of 1026.

In 1033, according to 714 option b, the AMF 1003 sends an NF Registration Request to the NRF 1006 indicating that it supports the network slice instance with CNSI-ID#2.

In 1034, according to 714 option b, the second SMF 1009 sends an NF Registration Request to the NRF 1006 indicating that it supports the network slice instance with CNSI-ID#2.

In 1035, the NRF 1006 associates both AMF 1003 and SMF 1009 with CNSI-ID#2 and stores it in a second table 1041 (update of first table 1040).

In 1036, according to 714 option b, the NRF 1006 notifies the AMF 1003 that it is associated with the network slice instance CNSI-ID#2.

In 1037, according to 714 option b, the NRF 1006 notifies the second SMF 1009 that it is associated with the network slice instance CNSI-ID#2.

To support a roaming case, in the signalling flow of FIG. 5, a PLMN-ID (Public Land Mobile Network Identification) may be sent along with the respective signalling message in 513, 517a, 516b, 521, 525a and 524b. Alternatively, while instantiating the AMF 503, SMF 508 and SMF 509 by step#3 512, AMF 503, SMF 508 and SMF 509 may be configured with the PLMN-ID that it belongs to.

In the signalling flow of FIG. 6, to support a roaming case, a PLMN-ID (Public Land Mobile Network Identification) may be sent along with the respective signalling message, in 613, 614, 615, 616, 617, 618, 619, 623, 624, 625, 626, 627, 628 and 629. Alternatively, while instantiating the AMF 603, SMF 608 and SMF 609 by step#3 612, AMF 603, SMF 608 and SMF 609 may be configured with the PLMN-ID that it belongs to.

In general, a PLMN-ID may be send along with the OAM-NSI-ID (e.g. in the flows of FIGS. 5 and 6) and along with the CNSI-ID (e.g. in the flows of FIGS. 9 and 10) to support roaming.

When the NSMF instantiates a new NW slice, there could be several CNSI-IDs assigned to different group of NFs.

Figure 11:
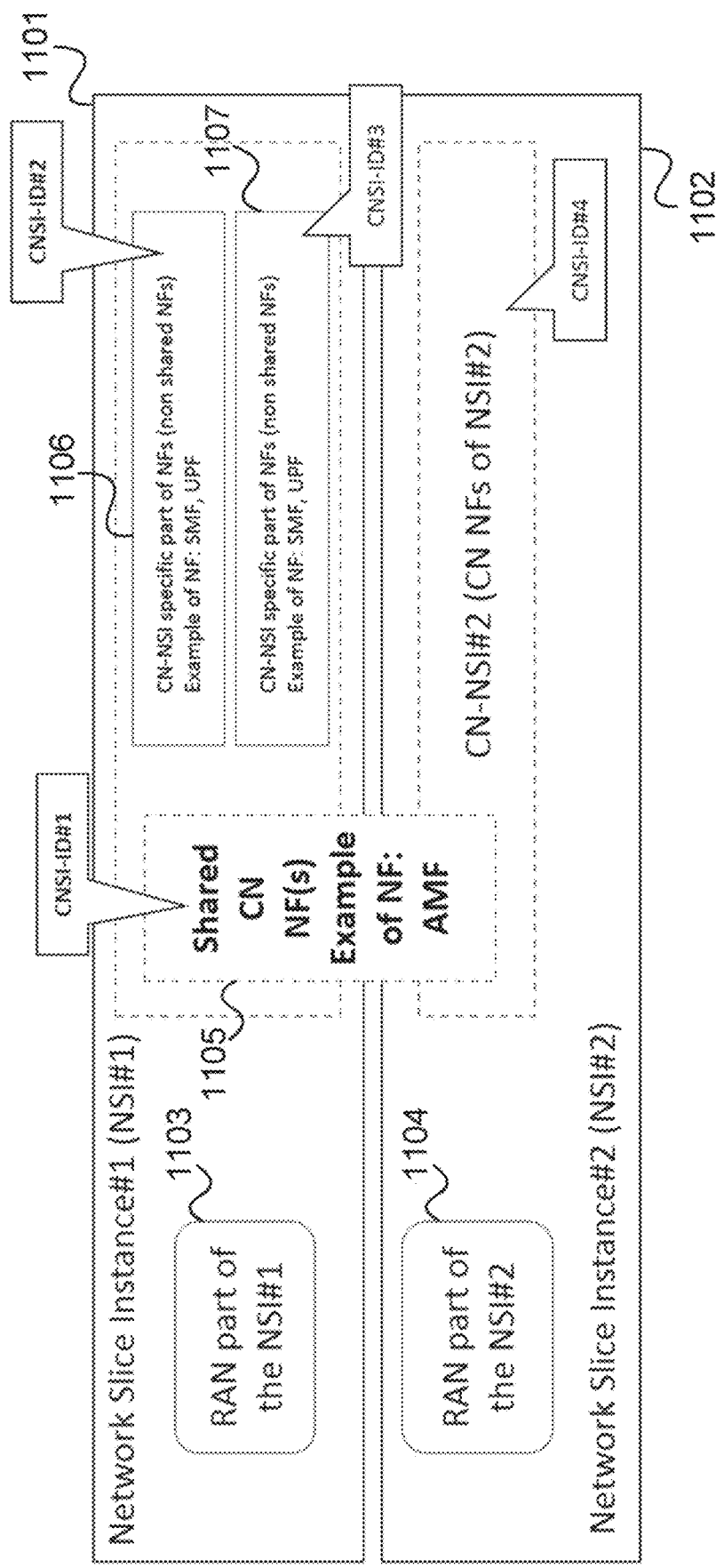
FIG. 11 illustrates a sharing of a network function between multiple network slice instances.

An example is shown in FIG. 11.

FIG. 11 illustrates a sharing of a network function between multiple network slice instances.

In this example, there is a first network slice instance (NSI) 1101 with an associated first RAN part 1103 and a second network slice instance (NSI) 1102 with an associated second RAN part 1104.

The first NSI 1101 and the second NSI 1102 may have shared network functions 1105, e.g. an AMF.

The first NSI 1101 has NSI specific network functions 1106, 1107. Similarly, the second NSI 1102 may have (CN-)NSI specific network functions (not explicitly shown).

A CNSI-ID sent to the AMF 1105 can be the same or different than a CNSI-ID sent to the NSI specific network functions 1106, 1107. The NSI specific part of network functions can for example comprise an SMF and a UPF.

Alternative to having an explicit signalling to send the CNSI-ID to AMF 1105, to CN-NSI specific part of NF 1106 and 1107, one can configure the AMF 1105 and Network Function of CN-NSI specific part of NF 1106 during the instantiation of a Network Slice Instance.

Figure 12:
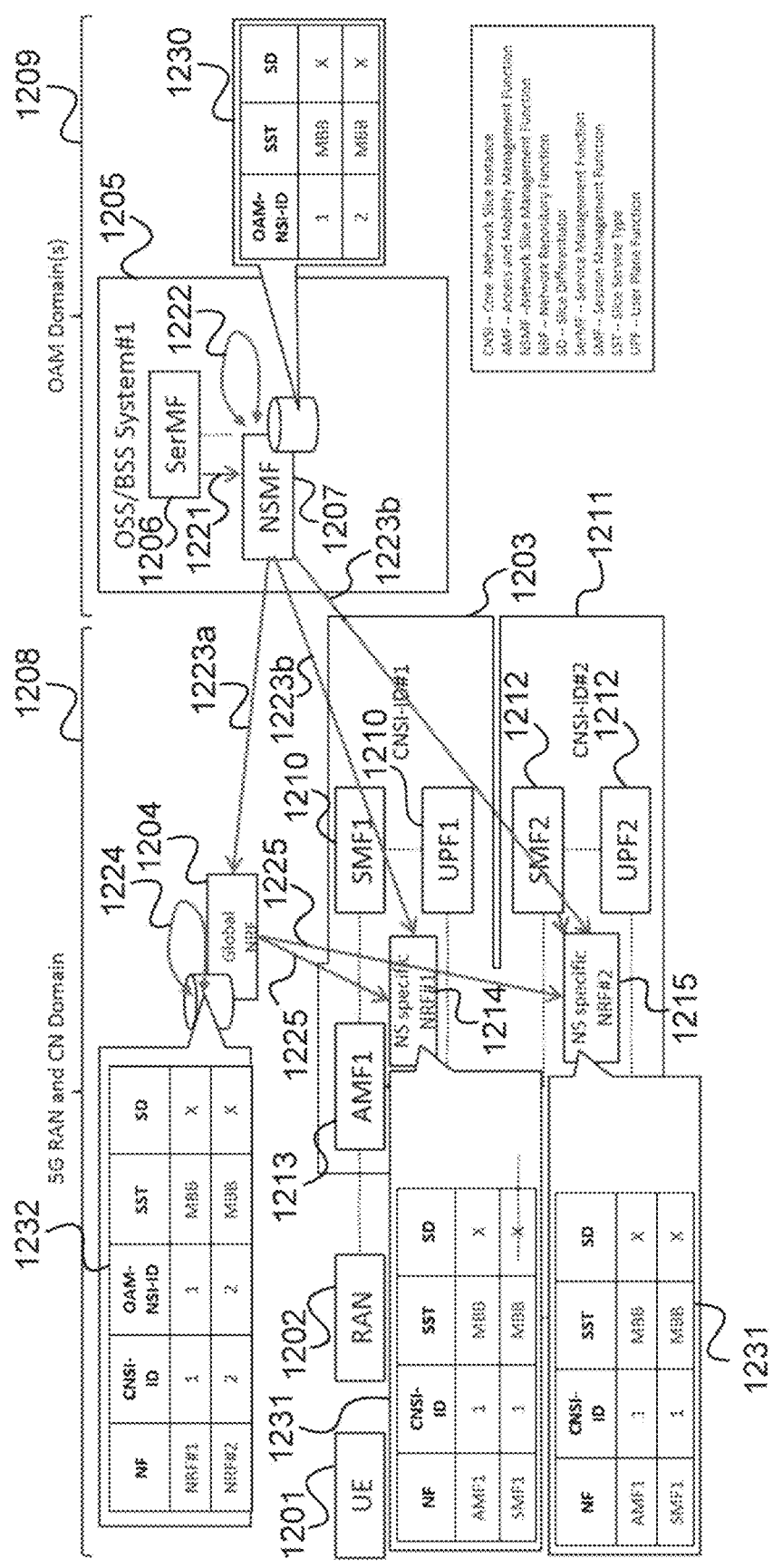
FIG. 12 shows a flow diagram illustrating an application of the approaches described above in an architecture with an hierarchical NRF.

FIG. 12 shows a flow diagram 1200 illustrating an application of the approaches described above in an architecture with an hierarchical NRF.

Similarly to FIG. 4, the flow takes place in a radio communication system comprising a UE 1201, a RAN 1202, a first core network slice instance 1203 with network functions 1210, a second core network slice instance 1211 with network functions 1212, an AMF 1213 shared between the first NSI 1203 and the second NSI 1211 and an OSS/BSS System 1205 (of an OAM domain 1209), wherein the OSS/BSS System 1205 comprises a Service Management Function 1206 and a Network Slice Management Function 1207.

Instead of a single NRF, there is in this example a global NRF 1204 (of a RAN and CN domain 1208) and a first NSI specific NRF 1214 (of the first NSI 1203) and a second NSI specific NRF 1215 (of the second NSI 1211), i.e. there is an hierarchical NRF.

The flow is described in the following.

In 1221, the Service Management Function (SerMF) 1206 requests for a network slice to serve MBB Service of an enterprise "X".

In 1222, the NSMF 1207 instantiates one or, in this example, the two NSIs 1203, 1211 and creates identifications OAM-NSI-ID#1, OAM-NSI-ID#2 for the NSIs 1203, 1211 and instantiates the network functions 1210, 1212, 1213, 1214 and 1215 for the NSIs 1203, 1211.

The NSMF 1207 stores an association of OAM-NSI-IDs to SSTs and

SDs in form of a first table 1230.

In 1223 option a (via OAM), the NSMF 1207 informs the global NRF 1204 about the new network functions 1210, 1212, 123 and the corresponding OAM-NSI-IDs, e.g. in the form of an association OAM-NSI-ID#1→[NRF#1], OAM-NSI-ID#2→[NRF#2].

In 1223 option b the NSMF 1207 informs the NSI specific NRFs 1214, 1215 about the list of NFs that are being created for the NSIs 1203, 1211. Each of NRF#1 and NRF#2 creates a respective second table 1231 for its database of NFs available in its respective NSI 1203, 1211, for example in the form of associations NRF#1→[AMF1, SMF1, OPF1], NRF#2→[AMF1, SMF2, UPF2].

In 1224, the global NRF 1204 creates CNSI-IDs CNSI-ID#1 and CNSI-ID#2 for the first NSI 1203 and the second 1211 and associates them with the OAM-NSI-ID#1 and OAM-NSI-ID#2 respectively. The global NRF 1204 stores an association of the NFs with the OAM-NSI-IDs to which they belong, the corresponding CNSI-IDs and SSTs and SDs in form of a third table 1232.

In 1225, the global NRF 1204 informs the first NSI specific NRF 1214 about CNSI-ID#1 and the second NSI specific NR 1215 about CNSI-ID#2. Then, each of the NSI specific NRFs 1214, 1215 includes in its second table 1231 the CNSI-ID that it receives from the global NRF 1204 in 1226.

It should be noted that the NSMF may be further subdivided into one or more NSSMFs (Network Slice Subnet Management Function). This is illustrated in FIG. 13.

Figure 13:
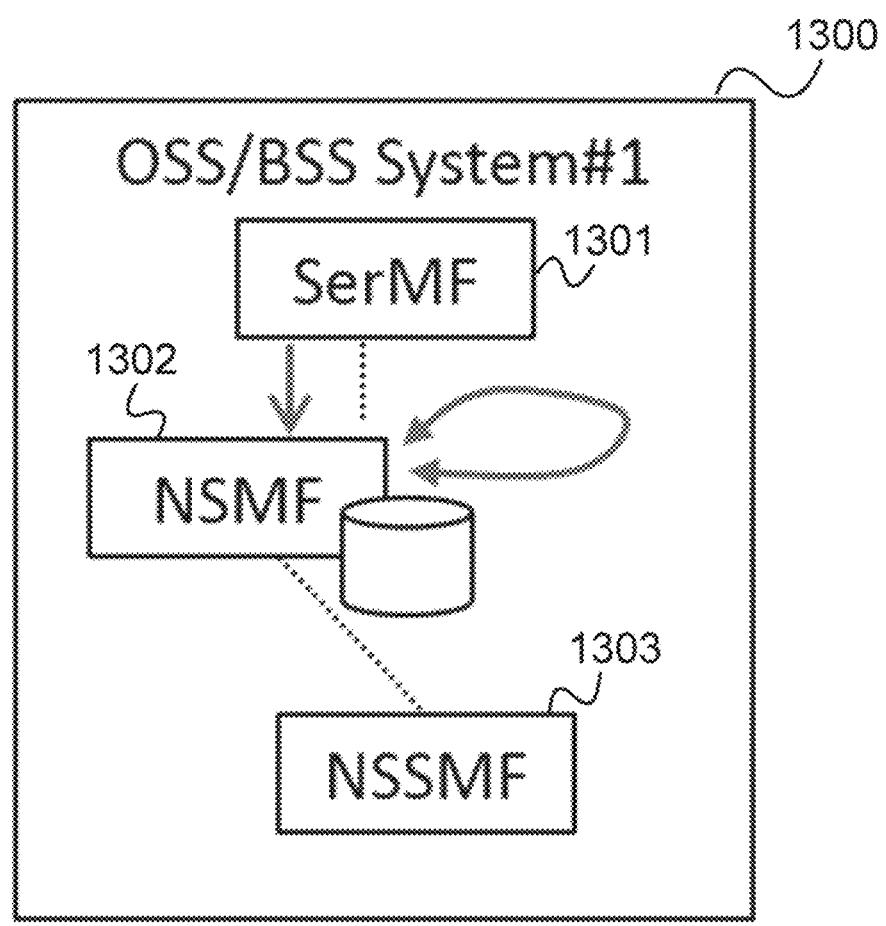
FIG. 13 shows an OSS/BSS system.

FIG. 13 shows an OSS/BSS system 1300.

The OSS/BSS system 1300 comprises an SerMF 1301, an NSMF 1302 and an NSSMF 1303.

The NSSMF 1303 can create an identifier that may be used for network slice subnet management purposes. This identifier may be configured at the NFs. There may be an interface between NSSMF directly to an NF in the CNSI to configure the NF with the CNSSI-ID (Core Network Slice Subnet Instance Identifier), A similar approach that the NSMF configures the NF or the NRF may again apply in this case.

Figure 14:
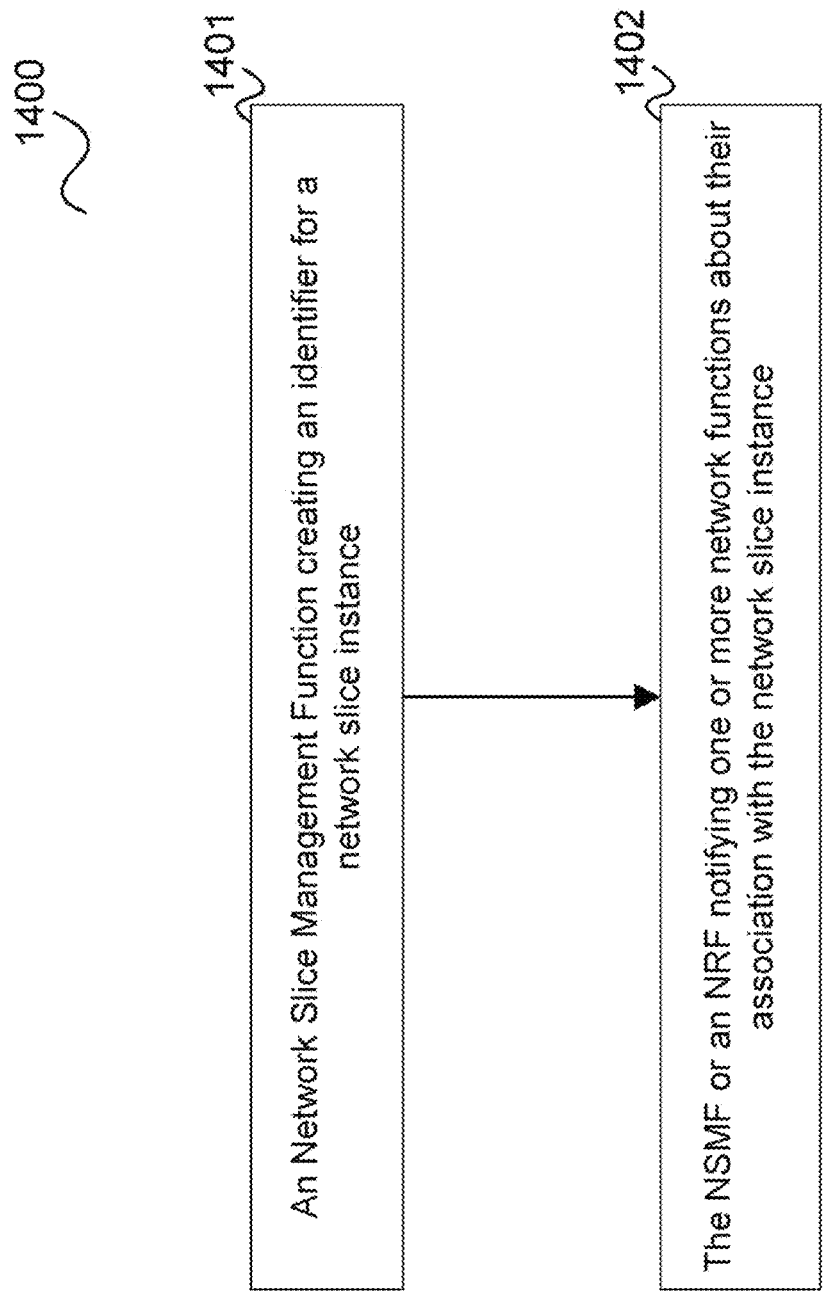
FIG. 14 shows a flow diagram illustrating a method for associating network functions with a network slice instance of a mobile radio communication network.

In summary, according to various embodiments, a method is provided as illustrated in FIG. 14.

FIG. 14 shows a flow diagram 1400 illustrating a method for associating network functions with a network slice instance of a mobile radio communication network.

In 1401, a Network Slice Management Function (NSMF) creates an identifier for a network slice instance (NSI) for Operations Administration and Management (OAM).

The mobile radio communication network comprises a core network and an OAM system, wherein the OAM system comprises at least the NSMF which has interfaces to network functions in the core network, wherein the network functions provide a communication service to a mobile terminal and wherein the core network further comprises a Network Repository Function, NRF, that maintains an association of network functions and network slice instances of the mobile radio communication network.

In 1402, the NSMF or the NRF notify one or more network functions of the network functions about their association with the network slice instance.

According to various embodiments, in other words, an NSMF or an NRF notify a network function which is to support a (core) network slice instance about an identification of the network slice instance they are to support. The OAM system and the core network may use the same or different identifiers for the network slice instance. The network function is for example informed about the network slice instance it is to support, i.e. with which it is associated by means of an identification used by the core network, i.e. of the core network domain (or radio access network and core network domain) which may or may not be the same identification as used for the network slice instance by the OAM system, i.e. in the OAM domain.

In other words, for example, an AMF and other NF(s) resided in an NSI are updated with the corresponding CNSI-ID in order to enable these network functions to know which CNSI-ID to support. This update (i.e. notification about their association) may be performed via the OAM system or for example by a mutual interface between the network functions themselves, e.g., triggering from an SMF via the N11 interface to the AMF.

Embodiments may allow selection of a Network Slice Instance (NSI) from a pool of network slice instances, which have the same slice identification parameter (i.e. the same Slice Service Type (SST) and the same Slice Differentiator (SD)) by using an NSI identifier. In particular, an AMF may select a specific SMF of a specific NSI for the purpose of e.g., different treatment for different class of customer belonging to the same enterprise, load balancing, selecting a NSI implemented by a specific vendor etc.

The method of FIG. 14 may be performed in response to a creation or a modification of the network slice instance.

Comprising providing the network slice instance in addition to another network slice instance.

The Network Repository Function for example provides network function discovery. It should be noted that the NRF may for example not be a network function that is NW slice specific. A Network Slice Selection Function may perform NSI selection but for example not perform NF selection within the NSI. It is possible that there is no direct interface between NSSF and RAN.

For example, a communication method between the OAM system and the CN system in a mobile network to manage the Network Slice Instance (NSI) during the NW slice instantiation procedure is provided. The said OAM system comprises at least the NW Slice Management Function (NSMF), which has interfaces to NW functions in the ON system. The said CN system in the mobile network comprises a set of network functions to provide communication service to the mobile terminal. In addition, the CN system comprises a Network Repository Function (NRF). The NRF maintains the relationship between the network function and the network slice instance available in the network. The said communication method may comprise one or more of the following:

- the NSMF instantiates a network slice and creates an identifier for this NSI for the OAM purpose (e.g., OAM-NSI-ID);
- the NSMF notifies the NRF about this new network slice with the information of its corresponding network function(s) and network slice identifier (e.g., OAM-NSI-ID);
- the NRF creates a new network slice identifier for the CN system (e.g., ONSI-ID) and associates it with the network slice identifier in the OAM system (e.g., OAM-NSI-ID); and
- the NRF registers the new network function in its database with the corresponding OAM network slice identifier and the corresponding CN network slice identifier.

The NRF may also maintains the network function capabilities information, i.e. information about capabilities of the network functions. Capabilities can be the Supported NW Slice Service Type (SST) and Supported Slice Differentiation (SD). A network function residing in the network slice newly created may register its capabilities with the NRF, i.e. provide network function capabilities information to the NRF.

Various examples are described below:

Example 1 is a method for associating network functions with a network slice instance of a mobile radio communication network as illustrated in FIG. 14.

Example 2 is the method of Example 1, wherein the identifier is an identifier shared between the core network and the OAM system and the NSMF notifies the one or more of the network functions about their association with the network slice instance by means of the created identifier.

Example 3 is the method of Example 1, wherein NRF creates a second identifier for the network slice instance and notifies the one or more of the network functions about their association with the network slice instance by means of the second identifier.

Example 4 is the method of Example 3, wherein the second identifier is a core network domain identifier for the network slice instance.

Example 5 is the method of Example 3 or 4, wherein the NRF maintains an association about the identifier and the second identifier.

Example 6 is the method of any one of Examples 3 to 5, wherein the NRF registers an association of the one or more network functions with the second identifier.

Example 7 is the method of any one of Examples 1 to 6, wherein the NSMF notifies the NRF about the association of the one or more network functions with the network slice instance.

Example 8 is the method of any one of Examples 1 to 7, wherein the NSMF notifies the NRF about the identifier of the network slice instance.

Example 9 is the method of any one of Examples 1 to 8, comprising the one or more network functions notifying the NRF about their availability and capabilities.

Example 10 is the method of Example 9, comprising the NRF notifying one or more of the network functions about their association with the network slice instance in response to the notification about their availability and capabilities.

Example 11 is the method of any one of Examples 1 to 10, wherein the NRF registers an association of the one or more network functions with the identifier.

Example 12 is the method of any one of Examples 1 to 11, wherein the one or more network functions informs another one of the network functions about its association with the network slice instance.

Example 13 is the method of any one of Examples 1 to 12, wherein the one or more network functions comprise one or more of an Access and Mobility Management Function, AMF, a Session Management Function, SMF, and a User Plane Function, UPF.

Example 14 is the method of any one of Examples 1 to 13, comprising the NSMF instantiating a network slice to create the network slice instance.

Example 15 is the method of any one of Examples 1 to 14, further comprising exchanging a public land mobile network identification between at least two of one or more network functions, between the NSMF and the NRF, or between the NSMF and AMF, or between the NSMF and SMF, or between the NRF and an AMF.

Example 16 is the method of any one of Examples 1 to 15, wherein the NSMF creates a plurality of identifiers for the network slice instance and the one or more network functions comprise a plurality of groups of network functions wherein each group of the groups is associated with one identifier of the plurality of identifiers.

Example 17 is the method of any one of Examples 1 to 16, where the NSMF is further divided into one or more network slice subnet management functions for managing subnet of network slice instance that also consists of one or more network functions.

Example 18 is the method of Example 17, where the network slice subnet management function may create a network slice subnetwork identifier, which the network functions resided within the network slice subnetwork are to be configured either by means of an explicit signalling or via configuration during the instantiation of the network slice instance.

Example 19 is the method of any one of Examples 1 to 18, wherein the NRF is a global NRF and the network slice instance has an network slice instance specific NRF and the one or more network functions are notified about their association with the network slice instance by means of notifying the network slice instance NRF.

The various components involved in the method (e.g. NRF, NSFM etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for associating network functions with a network slice instance of a mobile radio communication network comprising:
   a Network Slice Management Function, NSMF, creating an identifier for the network slice instance, NSI, for Operations Administration and Management, OAM, wherein the mobile radio communication network comprises a core network and an OAM system, wherein the OAM system comprises at least the NSMF which has interfaces to the network functions in the core network, wherein the network functions provide a communication service to a mobile terminal and wherein the core network further comprises a Network Repository Function, NRF, that maintains an association of network functions and network slice instances of the mobile radio communication network;
   the NSMF or the NRF notifying one or more network functions about their association with the network slice instance: and
   the one or more network functions directly notifying the NRF about their availability and capabilities.

2. The method of claim 1, wherein the identifier is an identifier shared between the core network and the OAM system and the NSMF notifies the one or more of the network functions about their association with the network slice instance by means of the created identifier.

3. The method of claim 2, wherein the NSMF notifies the NRF about the association of the one or more network functions with the network slice instance.

4. The method of claim 1, wherein the NRF creates a second identifier for the network slice instance and notifies the one or more of the network functions about their association with the network slice instance by means of the second identifier.

5. The method of claim 4, wherein the second identifier is a core network domain identifier for the network slice instance.

6. The method of claim 5, wherein the NRF maintains an association about the identifier and the second identifier.

7. The method of claim 5, wherein the NRF registers an association of the one or more network functions with the second identifier.

8. The method of claim 4, wherein the NRF maintains an association about the identifier and the second identifier.

9. The method of claim 8, wherein the NRF registers an association of the one or more network functions with the second identifier.

10. The method of claim 4, wherein the NRF registers an association of the one or more network functions with the second identifier.

11. The method of claim 4, wherein the NSMF notifies the NRF about the association of the one or more network functions with the network slice instance.

12. The method of claim 1, wherein the NSMF notifies the NRF about the association of the one or more network functions with the network slice instance.

13. The method of claim 1, wherein the NSMF notifies the NRF about the identifier of the network slice instance.

14. The method of claim 1, wherein the NRF registers an association of the one or more network functions with the identifier.

15. The method of claim 1, further comprising exchanging a public land mobile network identification between at least two of one or more network functions, between the NSMF and the NRF, or between the NSMF and an Access and Mobility Management Function, AMF, or between the NSMF and SMF, or between the NRF and the AMF.

16. The method of claim 1, wherein the NSMF creates a plurality of identifiers for the network slice instance and the one or more network functions comprise a plurality of groups of network functions wherein each group of the groups is associated with one identifier of the plurality of identifiers.

17. The method of claim 1, where the NSMF is further divided into one or more network slice subnet management functions for managing subnet of network slice instance that also consists of one or more network functions.

18. The method of claim 17, where the network slice subnet management function may create a network slice subnetwork identifier, which the network functions resided within the network slice subnetwork are to be configured either by means of an explicit signalling or via configuration during the instantiation of the network slice instance.

19. The method of claim 1, wherein the NRF is a global NRF and the network slice instance has a NRF specific to a single network slice instance and the one or more network functions are notified about their association with the network slice instance by means of notifying the network slice instance NRF.

* * * * *